United States Patent [19]

Seddon

[11] Patent Number: 4,469,733

[45] Date of Patent: Sep. 4, 1984

[54] FOAM SANDWICH CONSTRUCTION

[75] Inventor: Robert M. Seddon, Knaresborough, England

[73] Assignee: Unitex Limited, Yorkshire, England

[21] Appl. No.: 577,601

[22] Filed: Feb. 6, 1984

Related U.S. Application Data

[63] Continuation of Ser. No. 285,095, filed as PCT GB 80/00216, Dec. 16, 1980, publish as WO 81/01815, Jul. 9, 1981, § 102(e) date Jul. 16, 1981.

[30] Foreign Application Priority Data

Dec. 28, 1979 [GB] United Kingdom ................. 7944417

[51] Int. Cl.³ .......................... B32B 5/08; B22B 5/12
[52] U.S. Cl. .................... 428/109; 428/110; 428/112; 428/114; 428/284; 428/285; 428/294
[58] Field of Search ............... 428/102, 107, 109, 110, 428/112, 114, 284, 285, 286, 287, 292, 294, 295, 297, 298

[56] References Cited

U.S. PATENT DOCUMENTS

| | | | |
|---|---|---|---|
| 2,750,316 | 6/1956 | Bemmels | 428/295 |
| 3,044,146 | 7/1962 | Thomas et al. | 428/102 |
| 3,210,446 | 10/1965 | Yamakawa et al. | 428/295 |
| 3,444,024 | 5/1969 | Hillas | 428/295 |
| 3,472,730 | 10/1969 | Frigstad | 428/295 |
| 3,556,922 | 1/1971 | Green et al. | 428/338 |
| 3,642,561 | 2/1972 | Grobner | 428/480 |
| 3,860,478 | 1/1975 | Bartlow et al. | 428/63 |
| 3,950,587 | 4/1976 | Colijn | 428/311.5 |
| 3,953,641 | 4/1976 | Marquis | 428/295 |
| 4,040,881 | 8/1977 | Wallace | 428/316.6 |
| 4,086,384 | 4/1978 | Adelman et al. | 428/315.5 |
| 4,098,943 | 7/1978 | Degginger et al. | 428/295 |
| 4,121,958 | 10/1978 | Koonts | 428/311.7 |
| 4,172,869 | 10/1979 | Oishi et al. | 428/304.4 |
| 4,216,856 | 8/1980 | Moring et al. | 428/295 |
| 4,263,360 | 4/1981 | Adelman | 428/294 |
| 4,320,160 | 3/1982 | Nishimura et al. | 428/295 |

FOREIGN PATENT DOCUMENTS

| | | |
|---|---|---|
| 989287 | 5/1976 | Canada . |
| 2060386 | 6/1971 | France . |
| 926711 | 5/1963 | United Kingdom . |
| 1555271 | 11/1979 | United Kingdom . |

*Primary Examiner*—William J. Van Balen
*Attorney, Agent, or Firm*—Dennison, Meserole, Pollack & Scheiner

[57] ABSTRACT

The invention provides a laminate or sandwich suitable for structural purposes and which comprises a lightweight foam core having bonded on one or both sides a lightweight structural skin. More particularly the structural skin adapted to be bonded to the foam core to form the laminate or sandwich construction comprises a composite of resin and monofilaments. This structural skin is characterized in that these monofilaments are laid to extend along the skin without directional change relative to the extent of the skin. The monofilaments are at least 10 cm in length and are neither crimped nor woven. Within the composite forming the structural skin the ratio of resin to monofilament is ess than 2:1 by weight.

14 Claims, No Drawings

FOAM SANDWICH CONSTRUCTION

This application is a continuation, of application 285,095, filed as PCT GB80/00216, Dec. 16, 1980, publish as WO81/01815, Jul. 9, 1981, § 102(e) date July 16, 1981.

This invention relates to sandwich constructions using two external skins of a material having a relatively high modulus of elasticity between which is sandwiched a light-weight core as taught for example in our prior British pat. spec. No. 1 555 271.

In that specification there is described a sandwich structure comprising two external skins each of a material having a modulus of elasticity of at least $3.8 \times 10^6$ kN/m$^2$, and having a tensile strength which is at least $9.3 \times 10^4$ kN/m$^2$, between which skins is sandwiched a core of foam material having a density of between 75 kg/m$^3$ and 750 kg/m$^3$, a shear modulus of at least 3,400 kN/m$^2$ when measured at a strain of 10%, and a shear strength of not less than 620 kN/m$^2$, the said external skins being uniformly fixed to said core which latter constitutes the only means of stress transference between the skins.

Accordingly to one preferred feature of the invention described in specification No. 1 555 271 the core is of expanded polyurethane foam. This is the preferred material for employment in the sandwich structure according to the present invention, other details of which will be described below.

According to one practical embodiment as described in the aforementioned specification, each of the outer skins of the sandwich structure may be formed of a glass fibre reinforced resin material externally clad with a coating. This coating may be a so-called gel coat which is a coating which is often of pigmented resin intended to provide a smooth attractive finish to the product. However, any other suitable surface coating may be employed that is compatible with the resin and fibre composite employed for the structural part of the skin.

A suitable and economic form of skin construction of glass fibre reinforced resin has been chopped strand mats of glass fibres which are reinforced with polyester or epoxy resin. In such mats individual glass fibres are pressed randomly together to form a mat. Typical mats have glass contents of 150 to 950 grams per square meter.

An economic layup could comprise a single layer of mat suitably overlapped where edges occur, or any number of layers of mat plyed on top of each other, the resin being applied to impregnate in the usual conventional manner. Alternatively, the mat could be formed in situ to any thickness using suitable glass and resin spray equipment.

However, these glass fibres are randomly disposed and hence the spaces are also random. Also it has been determined that some resins and in particular most polyester resins, if cold cured, are liable to cold flowing when subjected to a strain as low as 0.08% in many cases.

When a given strain is exceeded some of the resin will cold flow and fibres will move relatively to each other, and this flow will continue so long as this particular load is sustained. With a good quality polyester, for example, if the load is reduced with corresponding reduction in strain a load level can be reached at which level, cold flow will cease or become minimal. This establishes the maximum load level for sustained static loads and is of a low order relative to the dynamic capacity of the material.

It has also been conventional to employ, in addition to or instead of chopped strand mat, a woven cloth-like sheet of glass fibres. In this the monofilaments are anything but straight. Instead the fiber rovings are sinuously woven together in a loose corrugated weave. This certainly facilitates the manipulation of the glass fibres during the laying up process, but the sinuous woven construction has lead to a disadvantage which has not received recognition hitherto. This is that when the resin has been applied, according to conventional teachings, adequately to wet the glass, the resultant structure has been found to experience permanent deformation under static loading of a surprisingly low order. The inventor has found that this disadvantage is caused to a significant extent, by load being transferred into the resin which is secreted between the sinuous weaves of the glass fibres, as though filling in the undulations between corrugations. Then due to the propensity of the resin to cold-flow at relatively low strains, a discussed hereinbefore, the layer of woven fibres can be bent and can remain bent.

It has been generally accepted and recommended, heretofore, that the resin/fibre ratio should be at least 2.5:1 by weight and in some cases the resin content has been considerably increased in the mistaken belief that increased stiffness or safety could be obtained by adding more resin binder. Some increases in stiffness and resistance to permanent deformation can indeed be obtained by methods of curing the resin binder which involve heating. However, this is often inconvenient or uneconomic.

Accordingly, glass fibres in the forms of chopped strand mat with randomly arranged fibres, or glass fibres in woven cloth-like sheet form with the fibres extending sinuously have both proved not entirely satisfactory for forming structural skins for foam sandwich constructions. In particular they lack the ability to sustain such proportion of the load as might reasonably be expected from an examination of a load/deflection curve for the particular structure.

The present invention has for its principal object to provide a structural skin for a foam sandwich construction, in particular a construction of the kind defined in British patent specification No. 1555 271, and in which, greater stiffness an resistance to undesirable non-elastic deformation under static loads is achieved.

This invention provides a structural skin adapted to be bonded to a foam core to form a laminate, wherein the skin includes a composite of resin and monofilaments, characterised in that these monofilaments are laid in parallel groups to extend along the skin, without directional change relative to the extent of the skin, the monofilaments being at least 10 cm in length and being neither crimped nor woven and wherein the ratio of resin to monofilament is less than 2:1 by weight within the composite.

Other advantageous features are defined in claims 2 to 13 to which reference is now made, The core is a foam material having a density of between 75 kg/m$^3$ and 750 kg/m$^3$, a shear modulus of at least 3,400 kN/m$^2$ when measured at a strain of 10%, and a shear strength of not less than 620 kN/m$^2$.

The core may be a foam of polyvinylchloride or preferably it is an expanded polyurethane foam.

In particular the invention provides a foam sandwich construction having a central foam core having bonded to it on one or both sides a structural skin as described above. In such a sandwich construction which has structural skins on both sides of the foam core, the long substantially straight monofilaments embedded in the resin, are correctly disposed to resist load, in tension on one side of the foam core and in compression on the opposite side of the foam core.

The monofilaments are, according to the invention, kept as straight as possible and are located close to the outside of the skin. Where the skin curves of necessity, the curvature of the monofilaments is kept as low as possible.

As stated the ratio by weight of resin to monofilament is less than 2:1 according to this invention. Preferably, where the monofilament is glass and the skin is attached to a core of polyurethane foam as described below, this ratio is kept below 2:1 for the sandwich construction as a whole, the ratio in the skin proper being below 1.75:1.

The resin content of a skin according to the present invention is much lower than had previously been thought necessary and the monofilaments which are advantageously laid as near as convenient to the outside of the skin, form the main structural element in the resin monofilament composite. These two factors, in combination, enable a skin according to the invention to be much stiffer than a skin composed of resin bonded chopped strand mat. If both, employing glass products and the same resin, are compared weight for weight, the skin according to the invention will have much greater load bearing capacity when incorporated in foam sandwich structures.

The resin is one of phenolic resin, polyester resin, polyurethane resin or epoxy resin and the monofilaments are of glass, carbon, nylon, aromatic polyamide, acrylic resin, metal or any combination of these. For example metal wire or strip could be employed.

The monofilaments are each at least 10 cm in length and they may be very much longer up to say 20 m or more. For maximum efficiency the monofilaments must extend over the full span of the beam between strong points supporting the beam. Where a beam continues over a number of strong points or supports and it is not convenient to span all the supports with one continuous monofilament, sets of the straight monofilaments should be overlapped at the location of a support.

Preferably to enable manipulation during construction, for example laying up in or on a mould, the monofilaments may be bound by light thread, so that there are formed bundles of parallel monofilaments which are still neither crimped nor woven but are still kept as straight as possible so that they can be laid to lie parallel with the surface of the resin monofilament composite skin.

The monofilaments may be formed into a laminate with one set of monofilaments extending longitudinally and with these being crossed by other sets of monofilaments laid closely adjacent and it may be, extending transversely of the first set. In such a laminate these longitudinal and transverse monofilaments will be as straight as possible. To this end they will not be interwoven although additional sinuous light threads may be provided which effect inter-location between the longitudinal and transverse straight monofilaments arranged together to constitute the straight monofilament mat.

These light threads do not perform any structural purpose. They are provided simply to give some relative location to the structural monofilaments prior to and in particular during laying up where they facilitate manipulation.

Such a straight monofilament arrangement may be formed, on one side of a light mat of randomly arranged short monofilaments. In this latter case the mat can advantageously be laid against the decorative outer gel coat, when laying up a female mould and the straight long load supporting monofilaments will then be disposed inside the mat. Resin will then be applied to fill the interstices between the straight long load supporting monofilaments. This resin will then form a bond with the mat laid against the gel coat, this bond bridging the straight monofilaments and linking with the foam which is then laid up against the straight monofilaments. Preferably however, a further mat of randomly arranged monofilaments is laid between the layer of straight filaments and the foam to result in a more homogeneous and more level surface with less resin content.

The aforementioned chopped strand mat can be attached to the monofilaments during the manufacture of the monofilament laminate but it is usually more convenient when using female moulds to apply a thin layer of chopped strand mat to the gel coat. Where the monofilaments are faced on one side with chopped strands the latter would be placed next to the foam if other layers were not included in the skin, the final requirement being that the roughness of the monofilaments be smoothed out on both sides As a substitute, just inside the gel coat there may be laid small balls or balloons of glass.

When using glass products a preferred composite mat consists of a layer of straight glass monofilaments disposed alongside an adjacent layer of randomly arranged glass filaments. There may be 500 to 2000 grams per square meter of glass in the straight monofilament layer, and more than 20 but less than 500 grams per square meter of glass in the mat layer.

It will be obvious from the foregoing that the long monofilaments are intended to take the major tensile and compressive stresses in the final sandwich structure. However, this construction allows also for a substantially reduced resin:monofilament ratio and there being less resin between the layers of monofilaments, the shear stiffness will be correspondingly higher and permanent deformation due to movement in shear, will be less.

One further aspect of the invention, broadly stated, comprises a structural skin which has bundles of parallel monofilaments, the individual monofilaments being substantially straight and being neither woven nor crimped and having a length of at least 10 cm and the bundles extending along the skin and over the span to which load is to be applied, the bundles of parallel straight monofilaments being wholly embedded in a thermosetting resin.

Such skins are usually arranged to bridge spans between strong points, that is supporting structural members analgous to joists. These joists may be as little as 10 cm apart or as much as 1 meter or more apart. Preferably the individual monofilaments extend over the whole of the span between these joists and are straight or have a low degree of curvature.

Other bundles of straight monofilaments may be arranged to extend transversely of the first longitudinally arranged bundles. These transverse monofilaments will also be non-sinuous and embedded in the resin.

It will be appreciated that the invention provides a structure in which the resin, instead of being reinforced by randomly arranged fibres, or fibres which are initially sinuous and interwoven as in woven rovings, is reinforced by straight monofilaments bridging the span where the skin extends between strong points.

By way of Example two beams were compared. Both had the same overall length and same width the thickness varying slightly because of the differences in construction. The weights were almost identical as shown below. In both cases an identical polyurethane foam core of 12.7 mm was used.

Beam 1 containing chopped strand mat was carefully prepared with a low resin content. If more resin had been employed the result would be worse. The resin to glass ratios of the two beams are shown below following other construction details as follows:

Beam 1

(a) 2 layers of randomly arranged glass monofilaments each layer having a glass content of 450 gm/m$^2$.

(b) 1 core layer of polyurethane foam.

(a) 2 layers of randomly arranged glass monofilaments each layer having a glass content of 450 gm/m$^2$.

Beam 2

($a_1$) 1 layer of randomly arranged glass monofilaments with a glass content of 150 gm/m$^2$.

(c) 1 layer of generally straight monofilaments with a glass content of 800 gm/m$^2$.

($a_2$) 1 layer of randomly arranged glass monofilaments with a glass content of 300 gm/m$^2$.

(b) 1 core layer of polyurethane foam.

($a_2$) 1 layer of randomly arranged glass monofilaments with a glass content of 300 gm/m$^2$.

(c) 1 layer of generally straight monofilaments with a glass content of 800 gm/m$^2$.

($a_1$) 1 layer of randomly arranged glass monofilaments with a glass content of 150 gm/m$^2$.

| Comparisons | Beam 1 | Beam 2 |
| --- | --- | --- |
| Resin: Glass Ratio - by weight | 2:1 | 1.6:1 |
| Weight-kg/sq meter | 7.08 | 7.01 |
| Spring rate in N/mm on 254 mm span (beam width 25.4 mm) | 72.89 | 168.81 |
| Max. central load with load still proportional to deflection under dynamic conditions. (254 mm span, beam width 25.4 mm) | 30.63 | 50.99 |
| Max, permissable static central load 254 mm span, 25.4 mm wide Kg | 2.96 | 13.71 |

To illustrate that these improved results were not due merely to the increase in the ratio of glass to resin a further beam was constructed as follows and with a resin to glass ratio of about 1.6:1 by weight.

Beam 3

($a_3$) 1 layer of randomly arranged glass monofilaments with a glass content of 450 gm/m$^2$.

(d) 1 layer of glass filaments each more than 10 cm in length but which were sinuously woven together to form a cloth-glass content 542 gm/m$^2$.

($a^3$) 1 layer of randomly arranged glass monofilaments with a glass content of 450 gm/m$^2$.

(b1) 1 foam core layer with a thickness of 19.25 mm.

($a^3$) 1 layer of randomly arranged glass monofilaments with a glass content of 450 gm/m$^2$.

(d) 1 layer of glass filaments each more than 10 cm in length but which were sinuously woven together to form a cloth-glass content 542 gm/m$^2$.

($a_3$) 1 layer of randomly arranged glass monofilaments with a glass content of 450 gm/m$^2$.

| | |
| --- | --- |
| Weight - kg/sq meter | 10.092 |
| Spring rate in N/mm on 254 span (beam width 25.4 mm) | 111.89 |
| Max. central load with load still proportional to deflection under dynamic conditions (254 mm span, beam width 25.4 mm) Kg | 21.71 |
| Max. permissable static central load 254 mm span, 25.4 mm wide Kg | 7.51 |

In Beam 2, the two layers $a_1$ were substantially non structural. Their main function was to provide a smooth external finish.

The layers (c) in Beam 2, had a glass content of 800 gm/m$^2$ and of this 400 gms ran in one direction along the beam tested while the remaining 400 gms ran across the beam and hence took hardly any structural part in supporting the load during the particular test. In Beam 2, the layer ($a_2$) makes little contribution structurally, its main purpose being to facilitate production.

It is of interest to compare the three Beams in terms of stiffness per unit weight and permissable static load per unit weight.

| | BEAM | | |
| --- | --- | --- | --- |
| | 1 | 2 | 3 |
| Stiffness/Unit Weight | 9.02 | 24.08 | 11.09 |
| Permissable Static Load/Unit Weight | 0.37 | 1.96 | 0.74 |

Even if in Beam 3 the resin content and the overall weight had been increased, there would be a reduction in the ability to support static load. If its foam core had been reduced in thickness to 12.7 mm, as with the cores of Beams 1 and 2 its resistance to static load would have been lower.

I claim:

1. In a foam sandwich structure suitable for use as a load bearing cladding with high stiffness to weight ratio and being of the type in which two skins are resin-bonded, one on each side, to a core of plastics foam material to form the sandwich with said core forming the main means of shear stress transference between the two skins, the improvement comprising:

(a) each skin comprising a layer of monofilaments of at least 10 cm in length laid substantially in parallel with one another to extend along the skin, with directional change being kept minimal, said skin monofilaments being non-sinuous and not woven;

(b) a mat of randomly arranged monofilaments interposed between the foam core and each adjacent monofilament skin layer; and (c) said filaments of said skin and said mat being bound to one another and to adjacent layers of the sandwich structure by a thermosetting resin, wherein the resin is present in a quantity sufficient to wet the filaments but not in excess, the ratio of resin to monofilament being less than 1.75:1 by weight throughout the layer of monofilaments forming each skin, and the ratio of resin to monofilament being less than 2:1 by weight throughout the sandwich structure as a whole, whereby a sandwich structure of improved load bearing strength is provided.

2. A sandwich structure according to claim 1 wherein each said mat comprises glass monofilaments and has a weight of more than 20, but less than 500 grams per square meter and wherein each layer of substantially parallel monofilaments comprises glass monofilaments and is of a weight of at least 500 grams per square meter.

3. A sandwich structure according to claim 2 wherein the resin and monofilaments are present in the skin and mat of each side of said foam core in a resin to monofilament ratio of less than 1.75:1 by weight.

4. A sandwich structure according to claim 1 wherein the resin is selected from the group consisting essentially of phenolic resin polyester resin, polyurethane resin and epoxy resin and wherein the monofilaments are selected from the group consisting essentially of glass, carbon, nylon, acrylic resin, aromatic polyamide and metal and combinations thereof.

5. A sandwich structure according to claim 1, wherein said skins each comprise at least one group of monofilaments laid parallel to one another and formed into a bundle by being bound with light thread to facilitate manipulation of the monofilaments as and before the resin is applied, prior to curing of the resin.

6. A sandwich structure according to claim 1 wherein to facilitate manipulation as and before the resin is applied and cured, groups of straight monofilaments are laid parallel to one another and pre-fixed to form a layer on one side of a mat of randomly disposed monofilaments which are shorter than said straight monofilaments.

7. A sandwich structure according to claim 6 wherein each layer of parallel laid monofilaments fixed to one side of the mat is crossed over by another layer of parallel laid monofilaments, all said parallel laid monofilaments being substantially straight, being neither crimped nor woven.

8. A sandwich structure according to claim 1, wherein the core of foam has a density of at least 75 kg/m$^3$.

9. A sandwich structure according to claim 8, additionally comprising a layer of resin on the outside of at least one of the skins.

10. A sandwich structure according to claim 9, wherein said layer of resin contains a filler material.

11. A sandwich structure according to claim 1, wherein said core comprises expanded polyurethane foam having a density of at least 75 kg/m$^3$ and wherein said sandwich additionally comprises, laid outside each skin, a further layer of monofilaments which are substantially parallel to one another, but at an angle inclined to the parallel filaments in the adjacent underlying layer.

12. A foam sandwich construction according to claim 11, wherein
 (a) said mat comprises glass monofilaments, in an amount of 250 to 350 grams per square meter;
 (b) said skin and said further layer comprise glass monofilaments, in an amount of 500 to 1500 grams per square meter; and
 (c) said sandwich additionally comprises an outer layer of randomly arranged glass filaments in an amount of 100 to 200 grams per square meter.

13. A foam sandwich construction according to claim 11, wherein the resin employed to bond the filaments to one another and to adjacent layers is polyester resin and includes a decorative surface coating applied to the outside of the sandwich construction.

14. A sandwich structure according to claim 1, wherein the structure is adapted to bridge a span between strong points as a cladding, and the non-sinuous monofilaments in the skin bonded at each respective side of the foam core are laid in parallel to bridge the span, the individual monofilaments being continuous and unbroken over the entire span bridged by the sandwich structure.

* * * * *